(12) United States Patent
Draper

(10) Patent No.: US 11,099,056 B2
(45) Date of Patent: Aug. 24, 2021

(54) MODULES FOR MULTI-MODULE WEIGHING APPLICATIONS

(71) Applicant: Mettler-Toledo, LLC, Columbus, OH (US)

(72) Inventor: Craig Draper, Ashley, OH (US)

(73) Assignee: Mettler-Toledo, LLC, Columbus, OH (US)

( * ) Notice: Subject to any disclaimer, the term of this patent is extended or adjusted under 35 U.S.C. 154(b) by 139 days.

(21) Appl. No.: 16/541,061

(22) Filed: Aug. 14, 2019

(65) Prior Publication Data

US 2021/0048331 A1 Feb. 18, 2021

(51) Int. Cl.
*G01G 19/02* (2006.01)
*G01G 21/28* (2006.01)

(52) U.S. Cl.
CPC ............. *G01G 19/02* (2013.01); *G01G 21/28* (2013.01)

(58) Field of Classification Search
CPC ................................ G01G 19/02; G01G 21/28
See application file for complete search history.

(56) References Cited

U.S. PATENT DOCUMENTS

| | | | | |
|---|---|---|---|---|
| 4,266,624 A | * | 5/1981 | Nordstron | G01G 21/22 177/128 |
| 4,281,728 A | * | 8/1981 | Dickason | G01G 19/027 177/134 |
| 4,828,055 A | * | 5/1989 | Hamilton | G01G 19/021 177/134 |
| 5,446,248 A | * | 8/1995 | Strasser | G01G 19/021 16/234 |

(Continued)

FOREIGN PATENT DOCUMENTS

DE 202004017239 U1 12/2004
EP 0851218 A1 7/1998
(Continued)

OTHER PUBLICATIONS

Mettler-Toledo, LLC, Vehicle Scales, Steel Deck Truck Scales, May 2014, 4 pages.

(Continued)

*Primary Examiner* — Randy W Gibson
(74) *Attorney, Agent, or Firm* — Standley Law Group LLP; Jeffrey S. Standley; Stephen L. Grant

(57) ABSTRACT

A module is used to configuring a multi-modular weighbridge. In one configuration, adjacent modules are coupled so that the modules bear as a unit upon the at least one load cell. In another configuration, the adjacent modules are coupled so that the modules bear independently upon associated load cells. In this latter configuration, a fastener assembly that couples the modules has a first fastener portion, affixed to an interior of each of the proximate compartments; and a second fastener portion connecting each of the first fastener portions to the other, the second fastener portion arranged to allow relative vertical movement of the modules while effectively restrictly any relative horizontal movement of the modules. In an embodiment, each first fastener portion has a clevis for receiving a tang provided by the second fastener portion, such that a clevis pin securing the tang is parallel to a horizontal plane of the module.

9 Claims, 3 Drawing Sheets

(56) References Cited

U.S. PATENT DOCUMENTS

| | | | | |
|---|---|---|---|---|
| 6,706,976 | B1 * | 3/2004 | Schuler | G01G 19/02 |
| | | | | 177/126 |
| 6,797,894 | B2 * | 9/2004 | Montagnino | G01G 21/22 |
| | | | | 177/238 |
| 8,035,042 | B2 | 10/2011 | Budic et al. | |
| 10,113,686 | B2 * | 10/2018 | Kempf | G01D 11/245 |
| 10,677,640 | B2 * | 6/2020 | Dehner | G01G 23/002 |
| 2011/0266073 | A1 | 11/2011 | Evesque | |

FOREIGN PATENT DOCUMENTS

| | | |
|---|---|---|
| EP | 1722205 B1 | 8/2007 |
| GB | 2451816 A | 2/2009 |
| IT | 1261619 B | 5/1996 |
| IT | MI20112354 A1 | 6/2013 |

OTHER PUBLICATIONS

Mettler-Toledo, LLc, VTS100 Truck Scale, Orthotropic Steel Weighbridge, Sep. 2014, 2 pages.

Lukmana, Ricky, VTS200 PDX installation, video accessed at https://www.youtube.com/watch?v=YM3Vr1Z4Xxs, Aug. 13, 2017.

Tiger Weighing Scales Co.,LTD., TWS-M Modular Weighbridge, website accessed at http://www.twscales.com/eacp_view.asp?id=127, Aug. 29, 2016, 6 pages.

* cited by examiner

MODULES FOR MULTI-MODULE
WEIGHING APPLICATIONS

CROSS-REFERENCE TO RELATED
APPLICATIONS

This non-provisional patent application makes no claim of priority.

TECHNICAL FIELD

The invention relates to a module for configuring multi-module weighbridges, weighbridges constructed from a plurality of the modules and the method of configuring a multi-module weighbridge. In particular, the modules are designed so that a common module design may be used to configure a multi-module weighbridge to operate either as a unitary weighing platform or as a multi-axle weighbridge.

BACKGROUND ART

When trucks are used to transport products over the roads, knowing the weight of each axle group is important to assure compliance with local road weight restrictions. In many of these applications, it is also desired to process a transaction for the product being transported. This is done with a legal-for-trade truck scale. It is often desirable to be able to achieve both of these objectives with a single device.

In general, there are different variations of a truck scale that can be used, and it is useful to introduce them here so that distinctions can be made.

In a first variation, an axle scale can be used. An axle scale is generally rectangular in profile, with a width that is large enough to span the entire axle or axle group that is being measured, in the direction perpendicular to the direction of travel of the truck. It also has a length in the direction of travel of the axle or axle group that is large enough to allow an entire axle group to rest upon the weigh platform. Although useful for assuring compliance with rad weight restrictions, the axle scale weighs only one axle or axle group at a time, with the rest of the truck off of the scale. In such a case, the weights from each individual axle group will not always sum up to the total weight of the vehicle and the axle scale cannot provide a "legal-for-trade" weight. The axle scale generally has a unitary weigh platform that has a width that is larger than its length.

The other variations used are generally referred to as "weighbridges" and they are notably larger in plan view than an axle scale. In one variation, all axles of the truck being weighed are positioned on a unitary weigh platform, even if that unitary platform comprises a plurality of modules that have been joined together. The weight obtained on such a weighbridge can provide a "legal for trade" weight by subtracting a known tare weight for the tractor and the empty trailer. This weighbridge cannot provide the weight of an individual axle or axle group.

The second type of weighbridge, referred to as a "multi-axle weighbridge," has a weigh platform that is separated into a plurality of sections along the length thereof. When a truck is driven onto the weighbridge, each axle or axle group rests upon its own platform section, although some platform sections may have no axles or axle groups resting thereupon. The multi-axle weighbridge provides accurate individual axle weights and total weight information in a single weighing procedure.

It is an unmet objective of the prior art to provide a weighbridge that can be configured from a plurality of modules of a common module design.

SUMMARY

This and other unmet objectives are met by a module for configuring a weighbridge. Such a weighbridge has a rectangular frame with four corners, the frame having a pair of parallel side edges and a pair of parallel end edges. The side edges are longer than the end edges. A compartment is provided, at each of the corners, for attaching the module to an adjacent module.

Many of these modules further comprise a pair of structural rails, parallel to the side edges; such that each of the compartments is a rectangular frame in which a portion of one of the side edges and a portion of one of the structural rails define two parallel sides of the compartment and a short rail acts with a portion of one of the end edges to define the other parallel sides of the compartment.

Of these, an interior portion of the rectangular frame, defined by the structural rails and the end edges, is provided with reinforcing elements to either support a deck plate or to reinforce a poured concrete slab.

In one configuration, a weighbridge is configured with a pair of the modules, aligned such that one of the end edges of each of the modules with the compartments along the end edges in proximity. In such a case, a passage opening is provided in each of the proximate compartments, formed by removing a portion of the end edges, a through hole is provided in each of the end edges of the proximate compartments; and a bolt and a nut passes through each of the through-holes, securing the modules. In this configuration, a portion of each of the compartments is aligned with at least one load cell beneath the weighbridge, such that the pair of modules bear as a unit upon the at least one load cell.

In another configuration, the pair of modules are also aligned along one of the end edges of each of the modules with the compartments along the end edges in proximity. A passage opening in each of the proximate compartments is formed by removing a portion of the end edges. In this case, a fastener assembly is arranged in each of the proximate compartments such that each of the proximate compartments bear independently upon at least one load cell positioned beneath the compartment.

To accomplish this, the fastener assembly comprises a first fastener portion, affixed to an interior of each of the proximate compartments; and a second fastener portion connecting each of the first fastener portions to the other, the second fastener portion arranged to allow relative vertical movement of the modules while effectively restrictly any relative horizontal movement of the modules.

In many of these embodiments, each of the first fastener portions has a clevis for making a clevis-type fastening with the second fastening portion, such that the respective first fastener portions each has a pair of clevis arms, each with a hole in each clevis arm aligned to use a clevis pin that is parallel to a horizontal plane of the module to retain a tang in the clevis arm, the tang provided by the second fastener portion.

In these embodiments, the second fastener portion comprises an elongate shaft with an eye formed at each end thereof, the respective eyes sized and adapted to operate as the tangs. The second fastener portion is formed from a first and a second eye bolt, each of the eye bolts having an eye formed at one end, integral with an elongate shaft portion, with the shaft portion of one eye bolt having external threading and the other eye bolt having internal threading that is complementary to the external threading such that a distance between the eyes of the respective eye bolts is adjustable.

In these embodiments, each of the clevis pins is secured in the clevis arms by a cotter pin.

BRIEF DESCRIPTION OF THE DRAWINGS

A better understanding of the inventive concept will be obtained by reference to the appended drawings, wherein identical parts are identified with identical reference numbers and wherein.

DETAILED DESCRIPTION OF THE EMBODIMENTS

Figure 1:
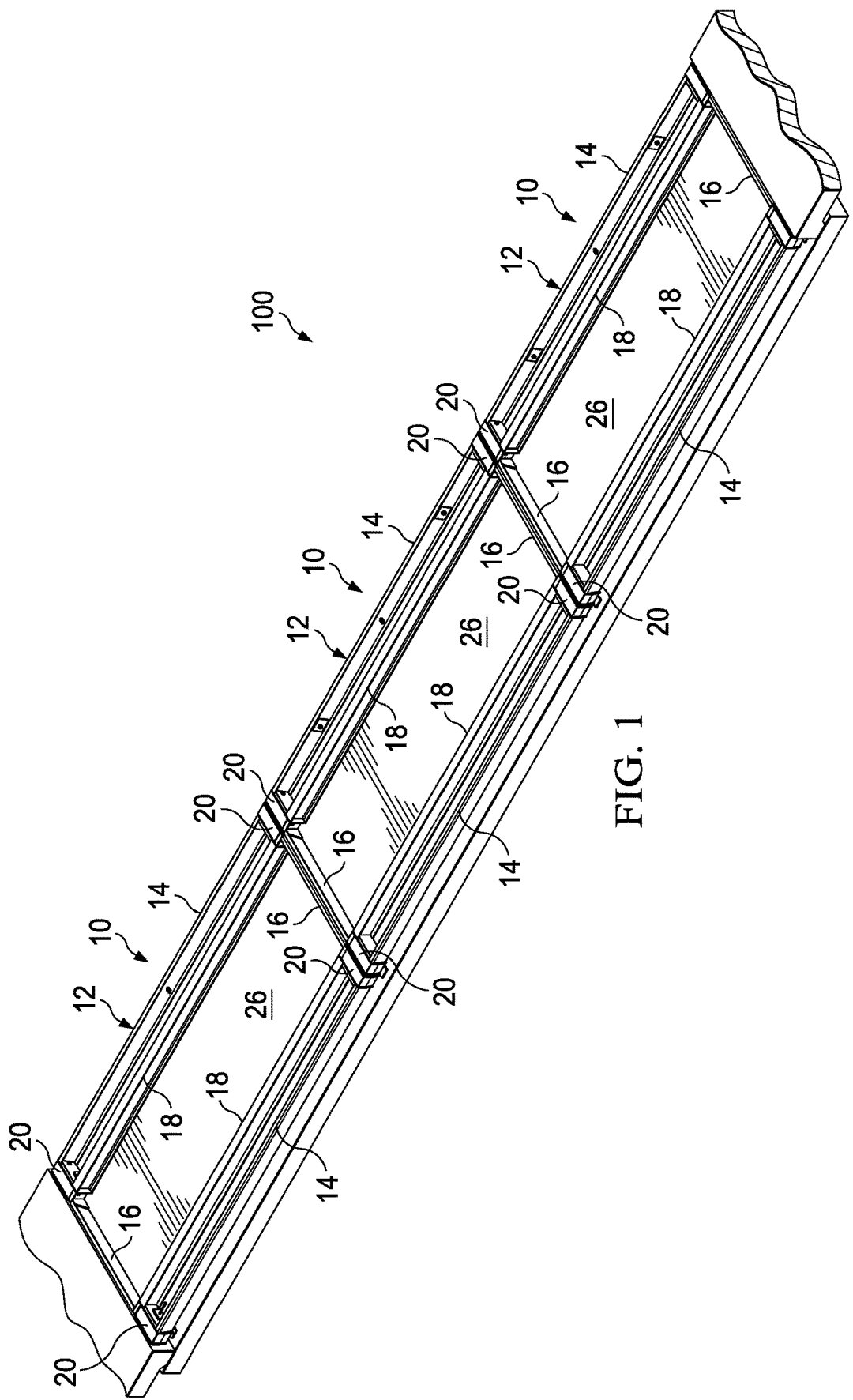
FIG. 1 is a perspective view of a weighbridge constructed of three modules, each module connected to adjacent modules using coupling elements.

FIG. 1 shows a perspective view of a multi-module weighbridge 100, constructed from three identical individual modules 10. Each module 10 has a rectangular frame 12 comprising a pair of parallel side edges 14 and a pair of parallel end edges 16. The end edges 16 are shorter in length than the side edges 14. At or near each of the corners where a side edge 14 intersects an end edge 16, a compartment 20 is provided inside a perimeter of the frame 12. These compartments 20 provide a number of functions, but they are used to attach the module 10 to an adjacent module or to associate at least one load cell, located beneath the module as a part of the weighbridge 100, with the module. Preferably, each compartment 20 comprises a rectangular frame, which is described in more detail in association with FIG. 2.

The module 10 can be implemented in at least two different modes. In a first mode, the frame 12 supplies a base for receiving a deck plate (not shown), typically a steel deck plate. When this is done, an interior 26 of the module 10 will be provided with a system of structural support elements, particularly at or near an upper surface of the module, on which the deck plate is positioned and fastened. In the second mode, the frame 12 operates as a structural form into which concrete can be poured, either at a manufacturing facility or at the point of installation. In either of these cases, the interior 26 of frame 12 may be provided with a base upon which the concrete is poured, as well as a system of structural elements to reinforce and secure the concrete to the frame.

In a typical arrangement of modules 10 to form a multi-module weighbridge 100, a plurality of the modules are aligned along the shorter end edges 16. Since a conventional tractor trailer arrangement will have at least three axles or axle groups, at least three modules 10 need to be aligned in this manner to enable a user to weigh each axle or axle group separately while the vehicle is positioned on the weighbridge 100. In some cases, four modules 10 will be aligned. The length of a vehicle being weighed can vary significantly, but, at least for over-the-road vehicles, the width of the vehicle is generally within a relatively narrow range. The width of a typical highway travel lane in the United States and Canada is 12 feet, so a load width that exceeds 8.5 feet is defined as an oversized load, and most vehicles will have a shorter load width.

In the depicted embodiment, each module 10 further comprises a pair of rails 18 which run parallel to the side edges 14.

Figure 2:
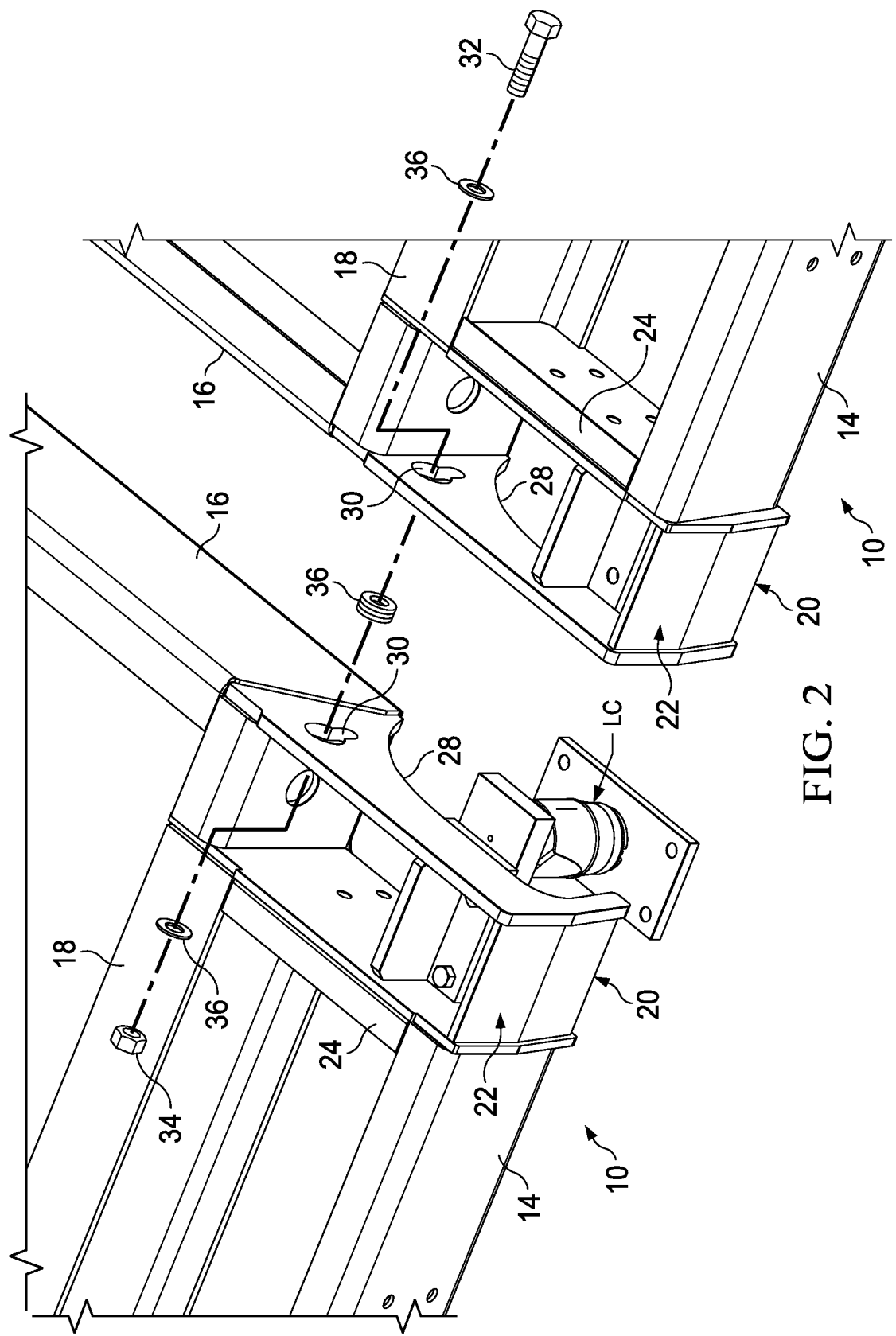
FIG. 2 is an enlarged perspective view of a connection between a pair of adjacent modules that configures the modules to operate in a unitary manner.

When using a module 10 as shown in FIG. 1 to construct a weighbridge, it is desired in some instances to couple a pair of adjacent modules so that they act in a unitary manner. FIG. 2 is an enlarged perspective view showing the details of one manner of coupling one of the two compartments 20 in a corner at one end of a first of the two modules 10 to a facing compartment in a corner of a second of the two modules. As described above, each of the compartments 20 comprises a rectangular frame 22 defined by a portion of one of the side edges 14, a portion of one of the end edges 16, a portion of rail 18 and rail 24, which is a short length of rail that spans the space between the rail 18 and the associated side edge 14, so that rail 24 being parallel to end edge 16.

The weight force acting on these compartments 20 will bear upon one or more load cells LC. One such load cell is depicted in FIG. 2. A portion of each of the end edges 16 on each of the compartments 20 is removed, providing a passage opening 28 between the compartments. Also, each of the end edges 16 has a through-hole 30. These through-holes 30 are aligned so that a bolt 32, a nut 34 and other requisite hardware 36 can be used to couple the respective compartments 20. Once coupled, a portion of each of the end edges 16 can bear upon a load-receiving platform of the load cell LC. Alternately, a plate in each compartment 20 can bear upon a load cell directly below the compartment.

Figure 3:
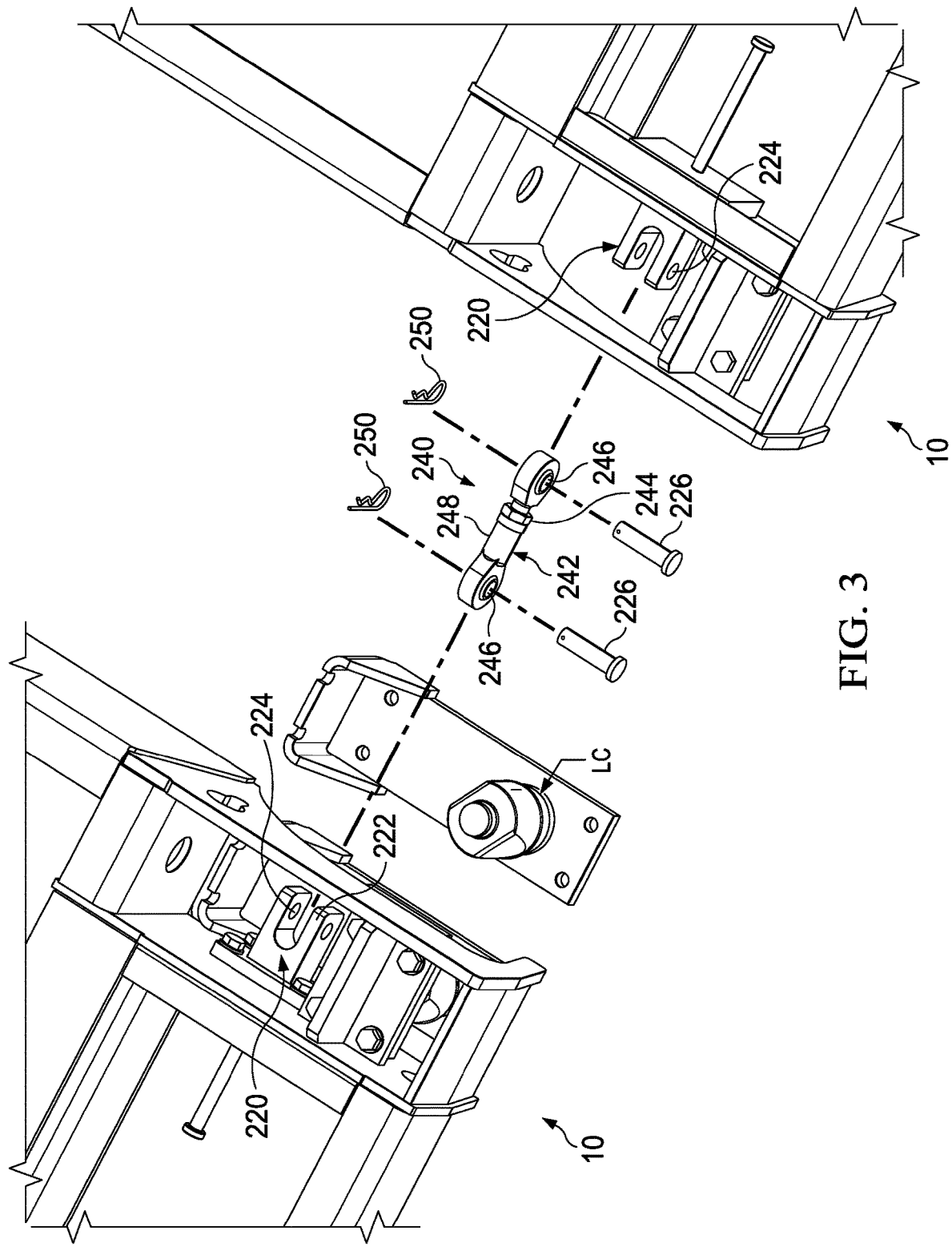
FIG. 3 is an enlarged perspective view of a connection between a pair of adjacent modules that allows the modules to operate independently of each other, providing a multi-axle weighbridge.

As a further feature of the inventive concept, FIG. 3 shows, in enlarged perspective view, an arrangement in which a pair of adjacent modules 10 are coupled, but the weight force acting on each of the two compartments 20 is transmitted to a load cell LC below the compartment, independently of the weight force acting on the other compartment. In this instance, at least one load cell LC is provided for each compartment 20, although, for sake of clarity, only the load cell receiving a load from the module on the left side of the figure is shown. Inside each compartment 20 of the adjacent modules 10 is a first fastener portion 220. A second fastener portion 240 connects the respective first fastener portions 220. In the depicted embodiment, each of the first fastener portions 220 has a clevis 222 for making a clevis-type fastening. The holes 224 of the clevis 222 are mounted so that a clevis pin 226 that passes therethrough is parallel to the top deck of the module 10. The second fastener portion 240 comprises a pair of eye bolts 242, 244, each of which has an eye 246 formed at one end, integral with an elongate shaft portion 248. Eye bolts 242, 244 differ from each other along the shaft portion 248 in that one of them has external ("male") threading and the other has internal ("female") threading that is complementary to the external threading. In this manner, the span between the respective eyes 246 is adjustable by rotating the male shaft portion in the female shaft portion. The respective eyes 246 define or constitute the respective tang portions of a clevis fastener that is provided by inserting the eye 246 into the clevis 222, passing the clevis pin 226 through the holes 224 in the clevis and the tang and securing the clevis pin in place, as with a cotter pin 250. As in the system described with regard to FIG. 2, second fastener portion 240 passes through the passage opening 28. Arranged in this manner, with the clevis pin 226 parallel to the horizontal deck of the module, the respective first and second fastener portions 220, 240 provide the respective modules 10 with ability to move vertically, but effectively restrict any motion in the two axes of the horizontal plane. In the depicted embodiment, the respective first fastener portions 220 are bolted into the rail 24 that is parallel to end edge 16.

What is claimed is:

1. A module for configuring a weighbridge, comprising:
a rectangular frame, with four corners, a pair of parallel side edges and a pair of parallel end edges, the side edges longer than the end edges; and
a pair of structural rails, parallel to the side edges;
such that a rectangular compartment is provided, inside a perimeter of the rectangular frame at each of the corners, for attaching the module to an adjacent module, each of the rectangular compartments having a portion of one of the side edges and a portion of one of the structural rails as a first pair of parallel sides and a second pair of parallel sides defined by a portion of one of the end edges and a short rail.

2. The module of claim 1, wherein:
an interior portion of the rectangular frame, defined by the structural rails and the end edges, is provided with reinforcing elements to either support a deck plate or to reinforce a poured concrete slab.

3. A weighbridge, comprising:
a pair of modules for configuring a weighbridge, having a rectangular frame with four corners, formed by a pair of parallel side edges and a pair of parallel end edges, the side edges longer than the end edges, with a compartment provided inside a perimeter of the rectangular frame at each of the corners, for attaching the module to an adjacent module, wherein the modules are configured along one of the end edges of each of the modules with the compartments along the end edges in proximity;
a passage opening in each of the proximate compartments, formed by removing a portion of the end edges;
a through hole in each of the end edges of the proximate compartments;
a bolt and a nut, passing through each of the through-holes, securing the modules; and
a portion of each of the compartments, aligned with at least one load cell beneath the weighbridge, such that the pair of modules bear as a unit upon the at least one load cell.

4. A weighbridge, comprising:
a pair of modules for configuring a weighbridge, having a rectangular frame with four corners, formed by a pair of parallel side edges and a pair of parallel end edges, the side edges longer than the end edges, with a compartment provided inside a perimeter of the rectangular frame at each of the corners, for attaching the module to an adjacent module, wherein the modules are configured along one of the end edges of each of the modules with the compartments along the end edges in proximity;
a passage opening in each of the proximate compartments, formed by removing a portion of the end edges;
a fastener assembly, arranged in each of the proximate compartments such that each of the proximate compartments bear independently upon at least one load cell positioned beneath the compartment.

5. The weighbridge of claim 4, wherein:
the fastener assembly comprises:
a first fastener portion, affixed to an interior of each of the proximate compartments; and
a second fastener portion connecting each of the first fastener portions to the other, the second fastener portion arranged to allow relative vertical movement of the modules while effectively restricting any relative horizontal movement of the modules.

6. The weighbridge of claim 5, wherein:
each of the first fastener portions has a clevis for making a clevis-type fastening with the second fastening portion, such that the respective first fastener portions each has a pair of clevis arms, each with a hole in each clevis arm aligned to use a clevis pin that is parallel to a horizontal plane of the module to retain a tang in the clevis arm, the tang provided by the second fastener portion.

7. The weighbridge of claim 6, wherein:
the second fastener portion comprises an elongate shaft with an eye formed at each end thereof, the respective eyes sized and adapted to operate as the tangs.

8. The weighbridge of claim 7, wherein:
the second fastener portion is formed from a first and a second eye bolt, each of the eye bolts having an eye formed at one end, integral with an elongate shaft portion, with the shaft portion of one eye bolt having external threading and the other eye bolt having internal threading that is complementary to the external threading such that a distance between the eyes of the respective eye bolts is adjustable.

9. The weighbridge of claim 6, wherein:
each of the clevis pins is secured in the clevis arms by a cotter pin.

* * * * *